(12) United States Patent
Mán

(10) Patent No.: US 8,839,688 B2
(45) Date of Patent: Sep. 23, 2014

(54) SWITCHABLE FREE-WHEEL ARRANGEMENT FOR A TRANSMISSION, PARTICULARLY FOR A CRANK-CVT OF A MOTOR VEHICLE

(75) Inventor: Lászlo Mán, Ottersweier-Unzhurst (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 74 days.

(21) Appl. No.: 13/065,335

(22) Filed: Mar. 19, 2011

(65) Prior Publication Data
US 2011/0263375 A1    Oct. 27, 2011

(30) Foreign Application Priority Data
Sep. 19, 2008    (DE) .................. 10 2008 048 027

(51) Int. Cl.
*F16H 59/00* (2006.01)
*F16D 41/08* (2006.01)

(52) U.S. Cl.
CPC ................................... *F16D 41/084* (2013.01)
USPC .......................................... 74/335; 192/45.1

(58) Field of Classification Search
USPC ............................................................ 74/335
See application file for complete search history.

(56) References Cited

U.S. PATENT DOCUMENTS

| | | | | |
|---|---|---|---|---|
| 3,643,768 A * | 2/1972 | Titt | ............................. | 192/41 A |
| 3,844,391 A * | 10/1974 | Hallerberg | ................... | 192/41 A |
| 4,546,864 A * | 10/1985 | Hagen et al. | ................. | 192/41 A |
| 4,880,093 A * | 11/1989 | Message | ...................... | 192/45.1 |
| 5,343,992 A * | 9/1994 | Stark et al. | ................... | 192/45.1 |
| 5,464,084 A * | 11/1995 | Aoki et al. | ....................... | 192/35 |
| 5,799,749 A * | 9/1998 | Yamamoto et al. | ........... | 180/247 |
| 6,257,386 B1 * | 7/2001 | Saito et al. | .................... | 192/48.2 |
| 6,997,295 B2 * | 2/2006 | Pederson et al. | ............ | 192/41 A |
| 7,108,626 B2 | 9/2006 | Friedmann | ........................ | 475/8 |
| 7,165,352 B2 * | 1/2007 | Langlotz | ......................... | 42/69.3 |
| 7,395,731 B2 * | 7/2008 | Miller et al. | .................... | 74/335 |
| 7,503,442 B2 * | 3/2009 | Straub et al. | ................. | 192/45.1 |
| 7,600,622 B2 * | 10/2009 | Feldmeier | ....................... | 192/43 |
| 7,644,813 B2 * | 1/2010 | Straub et al. | ................. | 192/45.1 |
| 7,721,860 B2 * | 5/2010 | Saka | ............................ | 192/43.1 |
| 7,997,396 B2 * | 8/2011 | Doppling et al. | ........... | 192/41 A |
| 8,202,187 B2 * | 6/2012 | Man | ............................... | 475/221 |

(Continued)

FOREIGN PATENT DOCUMENTS

DE    100 08 278 A1    9/2000
DE    102 43 533 A1    4/2003

(Continued)

*Primary Examiner* — David M Fenstermacher
*Assistant Examiner* — Zakaria Elahmadi
(74) *Attorney, Agent, or Firm* — Alfred J. Mangels

(57) ABSTRACT

A switchable free-wheel arrangement for a CVT transmission of a motor vehicle. Clamping bodies held in a cage are disposed between an outer ring and an inner ring. Each clamping body can be pressed with a relatively high force against the inner ring by an energy accumulator. The clamping bodies can be set up in the release direction or in the clamping direction by a switching mechanism. The energy accumulator generates a relative small setup force for setting up the clamping bodies. The energy accumulator includes two torsion springs disposed on the clamping body. It can, however, also have the shape of a helical spring that surrounds the clamping bodies and engages therein in special helical spring grooves.

14 Claims, 4 Drawing Sheets

(56) References Cited

U.S. PATENT DOCUMENTS

| | | | |
|---|---|---|---|
| 2005/0274585 A1* | 12/2005 | Straub et al. | 192/45.1 |
| 2007/0102255 A1* | 5/2007 | Gauthier | 192/43.1 |
| 2007/0175722 A1* | 8/2007 | Straub | 192/45.1 |
| 2007/0246319 A1* | 10/2007 | Ploetz et al. | 192/45.1 |
| 2008/0093189 A1* | 4/2008 | Wiesneth et al. | 192/45.1 |
| 2009/0301241 A1* | 12/2009 | Martin et al. | 74/335 |
| 2010/0326783 A1* | 12/2010 | Jackwerth et al. | 192/45.1 |
| 2011/0278124 A1* | 11/2011 | Friedmann | 192/45.1 |

FOREIGN PATENT DOCUMENTS

| | | |
|---|---|---|
| DE | 102 43 535 A1 | 4/2003 |
| FR | 2.178.664 | 11/1973 |
| JP | 06280898 A | 10/1994 |
| WO | WO 93/14238 | 7/1993 |
| WO | WO 2004/111483 A1 | 12/2004 |

* cited by examiner

SWITCHABLE FREE-WHEEL ARRANGEMENT FOR A TRANSMISSION, PARTICULARLY FOR A CRANK-CVT OF A MOTOR VEHICLE

BACKGROUND OF THE INVENTION

1. Field of the Invention

The present invention relates to a freewheel arrangement for a transmission, particularly for a crank CVT of a motor vehicle.

2. Description of the Related Art

DE 102 43 535 A1 discloses a continuously variable transmission that includes an input shaft and an output shaft that are supported, rotatably aligned parallel to each other in a transmission. Both shafts are connected with one another via an eccentric device of the input shaft and a freewheel device disposed on the output shaft, as well as by a connection device connecting the eccentric device and the freewheel device. The eccentric device includes several eccentric units that are disposed axially next to one another on the input shaft. The freewheel device includes several freewheel units that are disposed axially next to one another on the output shaft. To form each eccentric unit, the input shaft includes a guide section eccentrically offset with respect to its rotation axis, on whose jacket surface an eccentric component is rotatably supported. At least a connecting rod is rotatably disposed on the eccentric component during the design of the crank—continuous variable transmission (CVT).

Through the rotation of an adjustment shaft disposed in a recess of the input shaft, the size of eccentricity of the eccentric component is changed with regard to the rotation axis of the input shaft.

The freewheel units disposed on the output shaft have respective clamping bodies that are disposed between an inner ring formed by a section of the output shaft and an outer ring. The surfaces of the outer ring and the inner ring are matched to each other such that the clamping bodies can block the rotation in a relative direction of rotation between inner ring and outer ring, so that the outer ring and the inner ring are jointly rotated. In the other relative direction of rotation between the outer ring and the inner ring, no blocking effect is caused by the clamping bodies. The single clamping bodies are actuated in the blocking direction, which can occur at least through a spring element. Individual clamping bodies are positioned next to each other in the circumferential direction at least via a cage.

From DE 102 43 533 A1, a switching device that serves for switching the blocking function of the freewheel is known. This switching device includes several switching units that are disposed respectively between neighboring clamping bodies. The switching units are synchronously actuatable and have, respectively, a rotatable disk-shaped section as well as having a profiled section preferably including a profiled rod. On the profiled section, a torsion spring is attachable between the profiled section and a clamping body. For this purpose, the torsion spring has an arm that can actuate a clamping body in the corresponding blocking direction. The torsion springs and the profiled sections are eccentrically disposed with respect to the rotation axis of the disk-shaped section, so that upon rotation of the disk-shaped section, a circumferential displacement of the spring element and the profiled sections takes place. By rotating the disk-shaped sections by approximately 180°, the bracing direction and/or the force direction of the torsion spring changes. In this manner, a relative position corresponding to the traction operation of a motor vehicle and/or for a reverse drive of the motor vehicle can be set.

An object of the present invention involves arranging a switchable freewheel device so that with a good function, an extremely space-saving clamping body arrangement is made possible.

SUMMARY OF THE INVENTION

The object is achieved by a switchable freewheel device for a transmission, particularly for a crank CVT of a motor vehicle. A clamping body is held between an outer ring and an inner ring in a cage, whereby, respectively, a clamping body can be pressed by an energy accumulator against the inner ring with a relatively large pressure and whereby the clamping body can be set up by a switching mechanism in the release direction or in the clamping direction. Thereby, the energy accumulator is dimensioned such that for a relatively large contact pressure, a relatively small set-up force is developed for setting up the clamping bodies.

In a first exemplary embodiment of the present invention, the energy accumulator associated with a clamping body includes, respectively, two torsion springs disposed on the clamping body, by which each one produces set-up force over a relatively long lever arm. The torques generated by the set-up force of the torsion springs rather act in the opposite directions, so that the self-yielding torque difference is advantageously relatively small for setting up the clamping bodies. Two cylindrical recesses that extend parallel to the central axis lie appropriately opposite one another with regard to the central axis of the clamping body. In every recess, the body of a torsion spring is disposed. The arm parts of a torsion spring extend respectively on the one end and/or on the other end of the body of the torsion spring substantially perpendicularly to the central axis to the opposite sides of the torsion spring. Every bent end section of the torsion spring is disposed in an elongated hole extending in the circumferential direction of a wall part of the cage holding the clamping bodies. The essential advantage of this exemplary embodiment exists is that the spring elements provided for switching the freewheel device are not used between the individual clamping bodies in the cage, but rather in the cylindrical recesses of the clamping body. This results in an extremely space-saving clamping body arrangement.

The end sections of the radially outer torsion springs are fitted in radially outer elongated holes spaced apart in the circumferential direction of the wall parts. The end sections of the radially inner torsion springs are spaced apart in the circumferential direction in radially inner elongated holes of the wall parts.

To prevent the torsion springs from detaching from the recesses, the cylindrical recesses appropriately feature the somewhat circularly cylindrical bodies of the undercuts holding the torsion springs. Constructively, particularly simply and effectively, these undercuts are formed in that the recesses are formed and cover an angular section that is greater than 180°.

The bodies of the torsion springs are preferably tightly wound to produce a large contact pressure.

The cylindrical clamping bodies have a cross-section with a larger diameter and a smaller diameter, whereby the recesses on the side towards the smaller diameter lie opposite one another. The clamping bodies particularly feature an oval or elliptical cross-section. Since the recesses are disposed in the sections of the clamping bodies that do not get in contact with the inner rings and/or outer rings during their operation, the contact geometry of the clamping body arrangement is advantageously not disturbed.

The cage can include limit stops for the clamping bodies in the clamping position or release position, which in design simply has the form of limit stop parts extending perpendicularly to a wall part of the cage, lying radially inside, spaced apart in the circumferential direction.

In a second exemplary embodiment of the invention, the energy accumulator is in the form of an annular worm spring, which engages in worm spring grooves of the clamping bodies. The worm spring grooves are formed such that the worm spring on the one hand generates the relatively large contact force between the inner ring and the clamping bodies, and the other hand, the specially shaped base of the worm spring groove is made such that the contact force for the set-up moment is generated via a small lever arm through the effect of unrolling the worm spring in the worm spring groove. The base of the groove preferably corresponds approximately to a circular arc. That worm spring can be dimensioned preferably so strong that the emerging contact force between the clamping body and the inner ring, and the resulting frictional force emerging through the slipping of the clamping bodies is large enough to ensure the damping function. Because the worm spring is guided in the specially disposed worm spring groove of the clamping body, and the lever arm of the worm spring force and the worm spring radius always remain constant because of the special arrangement of the groove, the diffusion of the resiliency force of the clamping body can be kept small in a more advantageous manner. A considerable cost reduction can be obtained because of simple design of the present freewheel device attainable with a worm spring. The worm spring advantageously has a longer service life because it fits well into the clamping body groove.

BRIEF DESCRIPTION OF THE DRAWINGS

In the following, the invention and its embodiments are clarified in more detail in context with the Figures. Shown are.

DESCRIPTION OF THE PREFERRED EMBODIMENTS

The following considerations led to the invention. If one strongly presses the clamping bodies for the generation of a relatively high friction between the clamping bodies and the inner ring of the freewheel device, through a strong spring force against the inner ring, one must provide that the force for setting up the clamping bodies into the release- or clamping direction becomes relatively small. This can be achieved in that either for a large lever arm for the generation of the set-up force two torsion springs are used, of which the torque magnitudes act in different directions, whereby the torque difference that is decisive for setting up the clamping bodies is relatively small. The frictional forces developed by the two torsion springs add up nonetheless.

In the case, in which the high frictional force is generated by a worm spring, the torque can be generated by a very small lever arm, which is held constant over the entire clamping process. This can be ensured by a special groove for guiding the worm spring.

Figure 1:
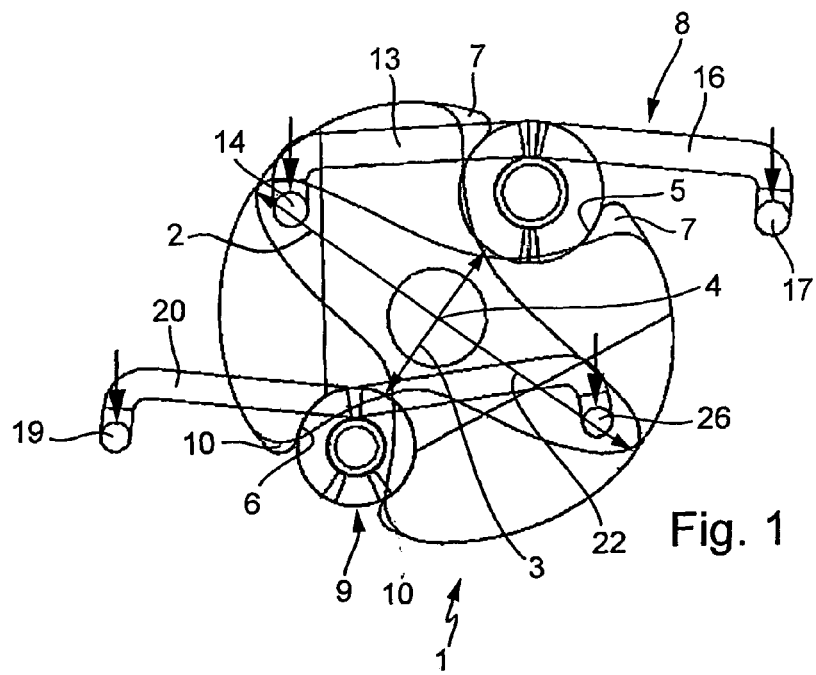
FIG. 1 a clamping body with two torsion springs.

In accordance with FIG. 1, a well-known clamping body 1, for example, oval or elliptical in form, includes a larger diameter 2 and a smaller diameter 3 in cross-section. The central axis of the cylindrical clamping body 1 is designated with 4.

Preferably in the direction of the smaller diameter 3, the clamping body 1 features two opposite cylindrical recesses 5, 6 with regard to the central axis 4, which each extend parallel to the central axis 4. A torsion spring 8 is fitted in the recess 5 featuring an undercut 7. Expressed more exactly, the recess 5 extends over an angular region that is larger than 180°, so that the undercut 7 is formed for the body of the torsion spring 8.

In a corresponding manner, the cylindrical recess 6, in which the torsion spring 9 is fitted, features an undercut 10.

Figure 2:
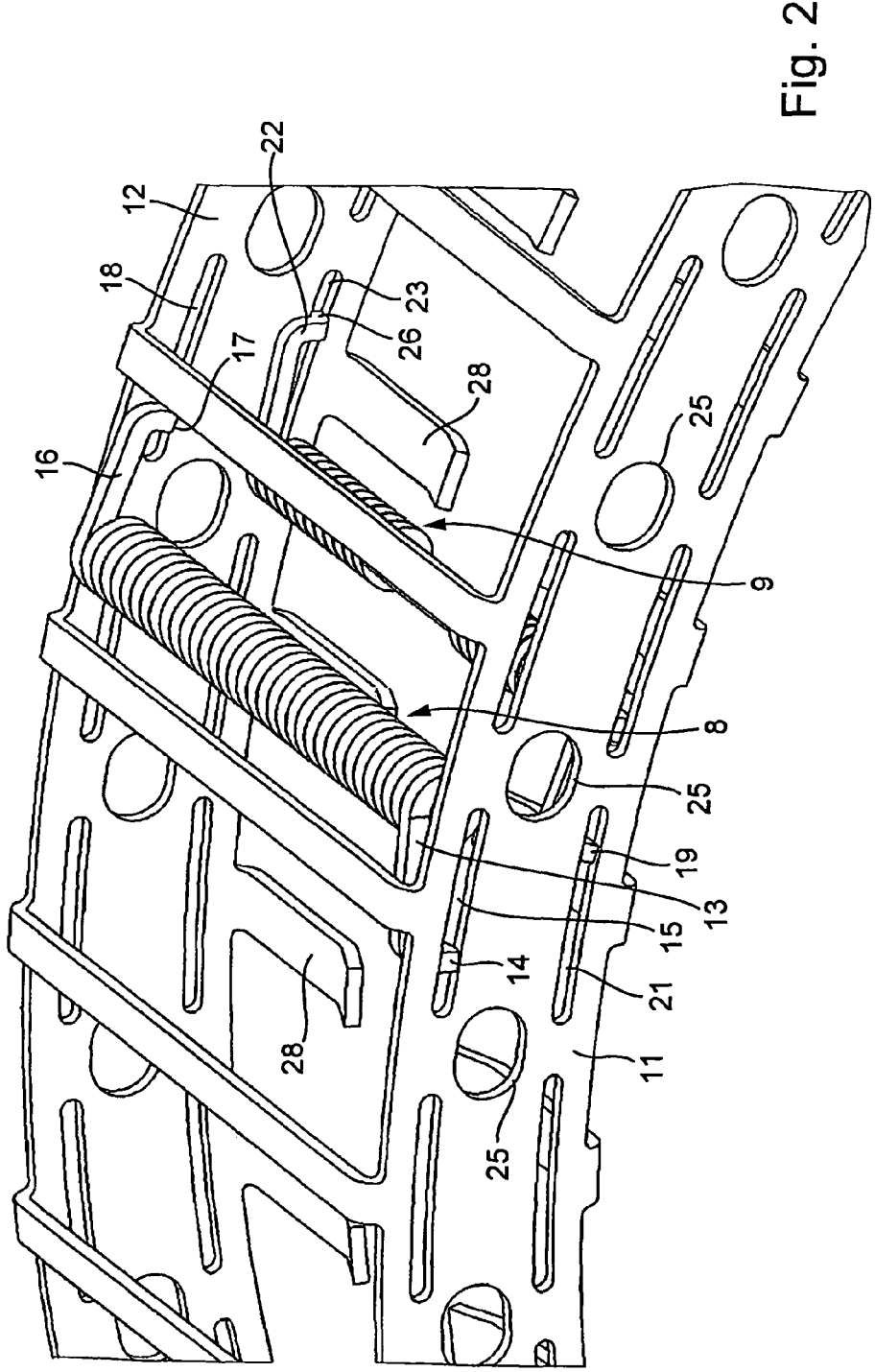
FIG. 2 in perspective representation viewed from the side, the torsion springs disposed in a cage of a freewheel device in accordance with a first exemplary embodiment of the present invention, whereby, for better visibility, the corresponding clamping body is not represented.

In accordance with FIG. 2, which by way of illustration of the arrangement of the torsion springs 8, 9 and their fastening points towards the lateral wall parts 11, 12 of the cage holding the clamping bodies 1, the clamping body 1 is not shown.

As can be seen, the torsion springs 8, 9 include, respectively, a spirally wound body, at whose ends the leg parts are attached, which extend 90° relative to the direction of the spring body. The torsion spring 8 has a leg part 13, in the manner shown in FIGS. 1 and 2, that is fixed with a bent end section 14 in an elongated hole 15 extending in the circumferential direction of the wall part 11 of the cage, and a leg part 16 that with its bent end section 17 is fitted in an elongated hole 18 extending in the circumferential direction of the wall part 12 of the cage 48.

In a corresponding manner, the torsion spring 9 includes a leg part 20, whose bent end section 19 is fitted in an elongated hole 21 that is located radially inward of the elongated hole 15 in the wall part 11. The end section 26 of the other leg part 22 of the torsion spring 9 is fitted in an elongated hole 23 extending in the circumferential direction of the wall part 12 that is located radially inward of the elongated hole 18 in the wall part 12.

Figure 3:
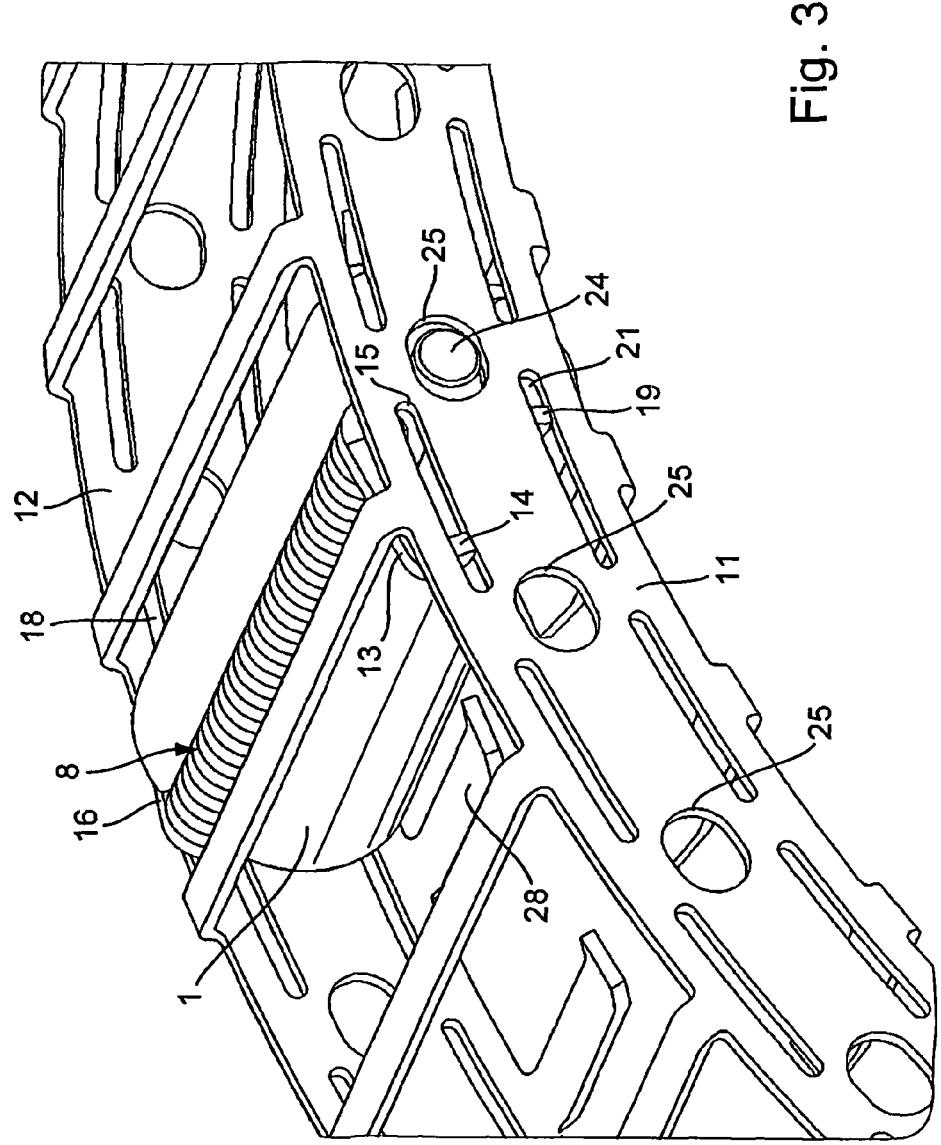
FIG. 3 the arrangement of FIG. 2, whereby a clamping body is represented.

FIG. 3 shows the arrangement of FIG. 2, whereby the clamping body 1 associated with the torsion springs 8 and 9 is represented. The clamping body 1 includes trunnions 24 projecting from both ends, extending along its central axis 4, which are supported in corresponding openings 25 in the wall parts 11 and 12.

Figure 4:
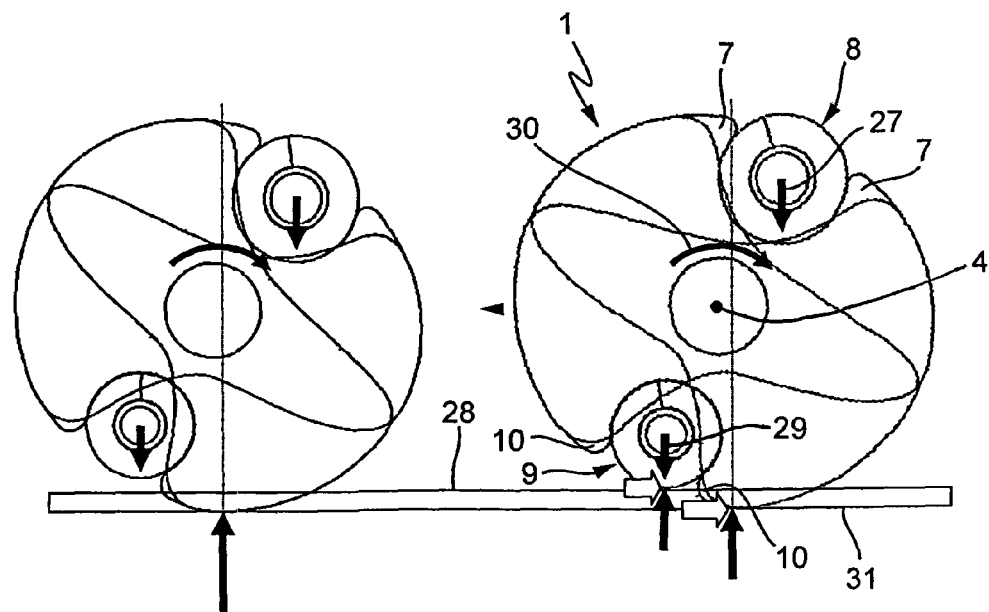
FIG. 4 a representation for the illustration of relative forces.

In connection with the FIGS. 1 and 4, the relative forces exerted by the torsion springs 8, 9 are now illustrated in detail. The torsion spring 8, based on prestress applied through the retention of its leg parts 13, 16, exercises a contact force acting in the direction of the arrow 27 towards the inner ring 31. In a corresponding manner, the torsion spring 9, based on the retention of the leg parts 20, 22 in the wall parts 11, 12 of the cage, generates a contact force in the direction towards the inner ring 31 (arrow 29). It is recognizable that the contact force of the torsion springs 8 and 9 applied in the direction of the arrows 27 and 29 add up, so that a high friction force is generated for damping the freewheel device.

It is of decisive importance that the lever-arm forces generated for a set-up moment of the clamping body 1 are relatively small, because they are applied on different sides of the central axis 4 and are therefore subtractive. The respective set-up moment results therefore from the difference of the set-up moments generated by the torsion springs 8 and 9. Thereby, the torsion spring force and the lever arms are tuned around the contact point between the inner ring 31 and the clamping body 1, so that only a small torque emerges for a good efficiency for a high contact force for a good damping effect of the freewheel.

In FIGS. 2 and 3, limit stops that prevent the clamping body 1 from tipping over are designated by 28. These extend preferably from the wall part 12 in the direction of the central axis 4 of the clamping body 1 toward the wall part 11.

The direction of rotation of the clamping body 1 resulting from the generated set-up moments is designated by arrow 30 in FIG. 4.

Figure 5:
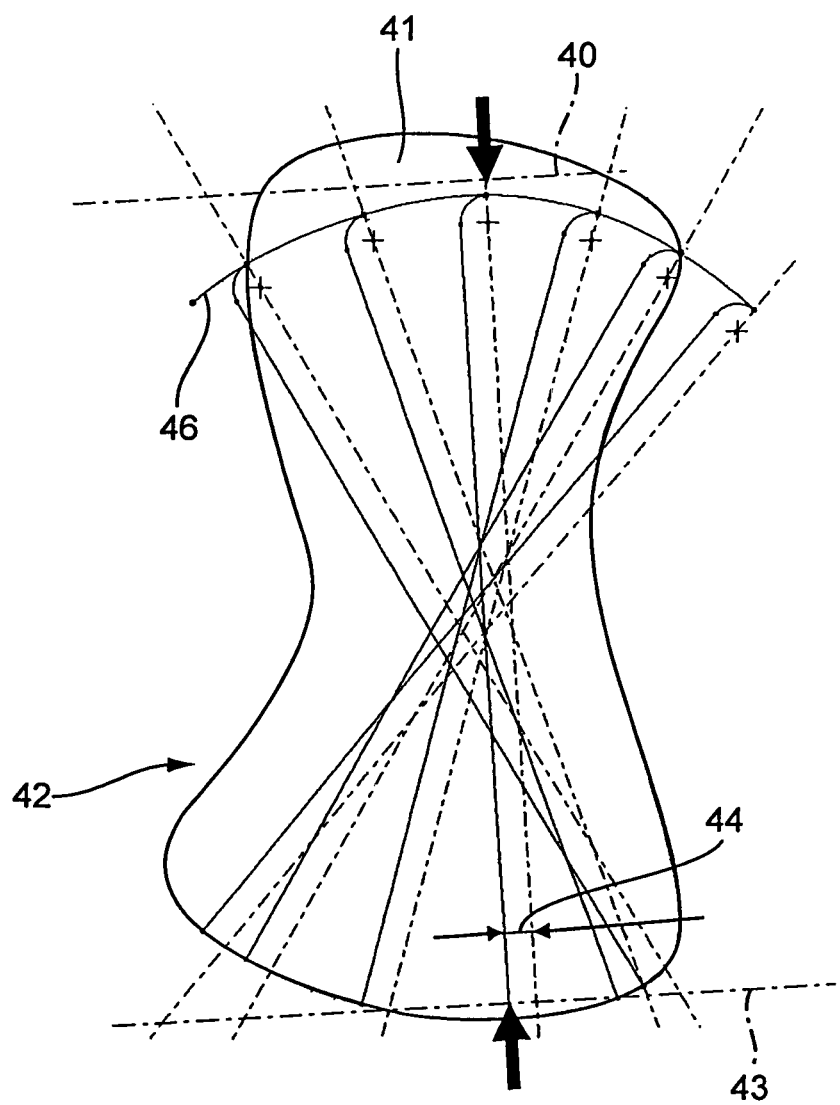
FIG. 5 a further embodiment of the invention.

In the following, an exemplary embodiment of the present invention is clarified in connection with FIG. 5, in which the friction force for damping is generated by a known worm spring, which, as schematically indicated by the line 40, engages into a worm spring groove 41 of a clamping body 42. The clamping body 42 is pressed against the inner ring 43. Thereby, the worm spring 40 is designed so strong such that the resulting contact force between the inner ring 43 and the clamping body 42, as well as through the friction force resulting from slippage, are large enough in order to ensure the damping function. Because this contact force for resiliency of the clamping bodies 42 is too large, a reduction of the lever arm for the set-up moment is achieved by using the worm spring 40 in a specially designed worm spring groove 41. If the clamping body 42 on the inner ring 43 rolls, the worm spring rolls on the specially shaped base of the worm spring groove 41 such that the lever arm 44 of the worm spring force and the worm spring radius 46, always remain constant as represented in FIG. 5. Because all geometric tolerances therefore exclusively emerge in the clamping body 42, the scatter of resiliency force of the clamping body 42 can be held low.

Attention is drawn to the fact that for the sake of simplicity, the arrangement of the clamping body 42 is shown only for one clamping direction in FIG. 5.

What I claim is:

1. A switchable freewheel arrangement for a crank CVT transmission of a motor vehicle, said freewheel arrangement comprising: cylindrical clamping bodies held in a cage and disposed between an outer ring and an inner ring, whereby each clamping body can be pressed with a relatively high contact force against the inner ring by an energy accumulator, whereby the clamping body is operable through a switching mechanism in a release direction and in a clamping direction of the freewheel arrangement, wherein the energy accumulator is configured so that by means of a small torque, it generates a relatively small set-up force for setting up the clamping body, and wherein the energy accumulator includes two torsion springs having a plurality of coaxial coils, and wherein the torsion springs are disposed on respective radially opposed, axially extending sides of a clamping body, wherein the clamping body is cylindrical and includes a central axis and external cutouts defined by respective concave arcs and that have respective axes that extend parallel to the clamping body central axis and are positioned radially opposite each other relative to the clamping body central axis, wherein in each radially opposed cutout a torsion spring is disposed having a central longitudinal axis and a laterally-outwardly-extending leg at each longitudinal end of the clamping body, the torsion springs for each clamping body including respective radially inner coil springs relative to the clamping body central axis and respective radially outer coil springs relative to the clamping body central axis, wherein the legs at the longitudinal ends of the torsion springs extend substantially perpendicularly to the spring central axis from opposite ends of the torsion springs, and wherein respective bent outer end sections of the laterally-outwardly-extending legs of the torsion springs are disposed in respective elongated holes provided in respective spaced, annular, coaxially positioned wall parts that extend in the circumferential direction to define the cage holding the clamping bodies, wherein each spring generates a set-up force through a relatively large lever arm provided by the longitudinal ends of the torsion springs and extending at respective outer ends of each of the springs, whereby torque magnitudes generated by the set-up forces of the torsion springs act in respective opposite directions, so that a resulting torque difference for setting up the clamping bodies is relatively small.

2. The freewheel arrangement according to claim 1, wherein the bent end sections of radially outer torsion springs are received in respective outer torsion-spring-receiving elongated holes that are spaced apart from each other in the circumferential direction of each of the wall parts.

3. The freewheel arrangement according to claim 2, wherein the bent end sections of radially inner torsion springs are received in respective inner torsion-spring-receiving elongated holes that are spaced radially inwardly of the outer torsion-spring-receiving elongated holes and spaced apart from each other in the circumferential direction of each of the wall parts.

4. The freewheel arrangement according to claim 1, wherein the cylindrical cutouts include undercuts for holding the torsion springs.

5. The freewheel arrangement according to claim 4, wherein the undercuts are so formed that the torsion-spring-receiving cutouts are of partial cylindrical form, and the cutouts have a peripheral cylindrical extent that is defined by an included angle larger than 180°.

6. The freewheel arrangement according to claim 1, wherein the torsion springs are tightly wound to generate a large contact force at outer ends of the springs.

7. The freewheel arrangement according to claim 1, wherein the cylindrical clamping bodies have a cross-section defined by a larger outer diameter and a smaller inner diameter, and wherein radially inner portions of the cutouts lie radially opposite each other and define the smaller diameter.

8. The freewheel arrangement according to claim 7, wherein the clamping bodies have a substantially oval cross-section.

9. The freewheel arrangement according to claim 1, wherein the cage includes respective limit stops for contacting the clamping bodies to limit rotary movement of the clamping bodies.

10. The freewheel arrangement according to claim 9, wherein the limit stops have the form of limit stop parts that extend perpendicularly inwardly from a wall part of the cage in an axial direction substantially parallel to the axis of an adjacent clamping body and are circumferentially spaced from each other along the wall part.

11. The freewheel arrangement according to claim 1, wherein the clamping bodies include worm spring grooves formed in the external cutouts and the two annular worm springs engage in respective worm spring grooves formed in the clamping bodies, whereby the worm spring grooves are formed such that the worm spring on one hand generates a relatively large contact force between the inner ring and the clamping bodies, and whereby the worm spring grooves each include a base that is in a form such that a resiliency force for the set-up element is generated via a small lever arm by unrolling the worm spring in the worm spring groove.

12. The freewheel arrangement according to claim 11, wherein the bases of the worm spring grooves are substantially a circular arc in cross section.

13. The freewheel arrangement according to claim 1, wherein the clamping bodies include trunnions at axially opposite ends thereof, and wherein the trunnions are received in respective opposed openings formed in each of the lateral wall parts that define the cage.

14. The freewheel arrangement according to claim 13, wherein the trunnion-receiving openings in the cage wall parts are elongated in the circumferential direction.

\* \* \* \* \*